Dec. 3, 1946.  J. L. ARTHUR ET AL  2,411,845

COOLING SYSTEM FOR AIRCRAFT ENGINES

Filed June 9, 1944

Inventors
James L. Arthur &
Robert M. Williams
By Blackmor, Spencer &   
Attorneys Patented Dec. 3, 1946

2,411,845

UNITED STATES PATENT OFFICE 2,411,845

COOLING SYSTEM FOR AIRCRAFT ENGINES

James L. Arthur and Robert M. Williams, Indianapolis, Ind., assignors to General Motors Corporation, Detroit, Mich., a corporation of Delaware Application June 9, 1944, Serial No. 539,410

4 Claims. (Cl. 244—59)

This invention relates to cooling means and more specifically to auxiliary cooling means for the propulsion means in self-propelled bodies.

With the increase in size and the tendency toward completely housing propulsion means for various driven bodies such, for example, as aircraft, the question of cooling said propulsive means has assumed major proportions.

When aircraft are flying through the air, the speed attained thereby provides sufficient pressure to cause coolant flow over the engines or other heated parts or through the radiators therefor to maintain the same sufficiently cool. These parts must, of course, be either streamlined themselves to reduce air friction or must be enclosed within streamlined bodies for the same purpose and this enclosure introduces cooling problems.

In installations, however, where cooling air pressure is sufficient during flight, when the aircraft is on the ground and the engines are being tested or idling, there is not sufficient pressure means for introducing cooling fluid such as air to the engine chambers.

It is an object of our invention to provide supplemental cooling means for aircraft engines.

It is a further object of our invention to provide auxiliary cooling means for use on aircraft engines when the aircraft is on the ground.

It is a still further object of our invention to provide supplemental cooling means for aircraft engines that may be controlled from the cockpit.

With these and other objects in view which will become apparent as the specification proceeds, our invention will be best understood by reference to the following specification and claims and the illustrations in the accompanying drawing, in which:

Figures 1, 2:
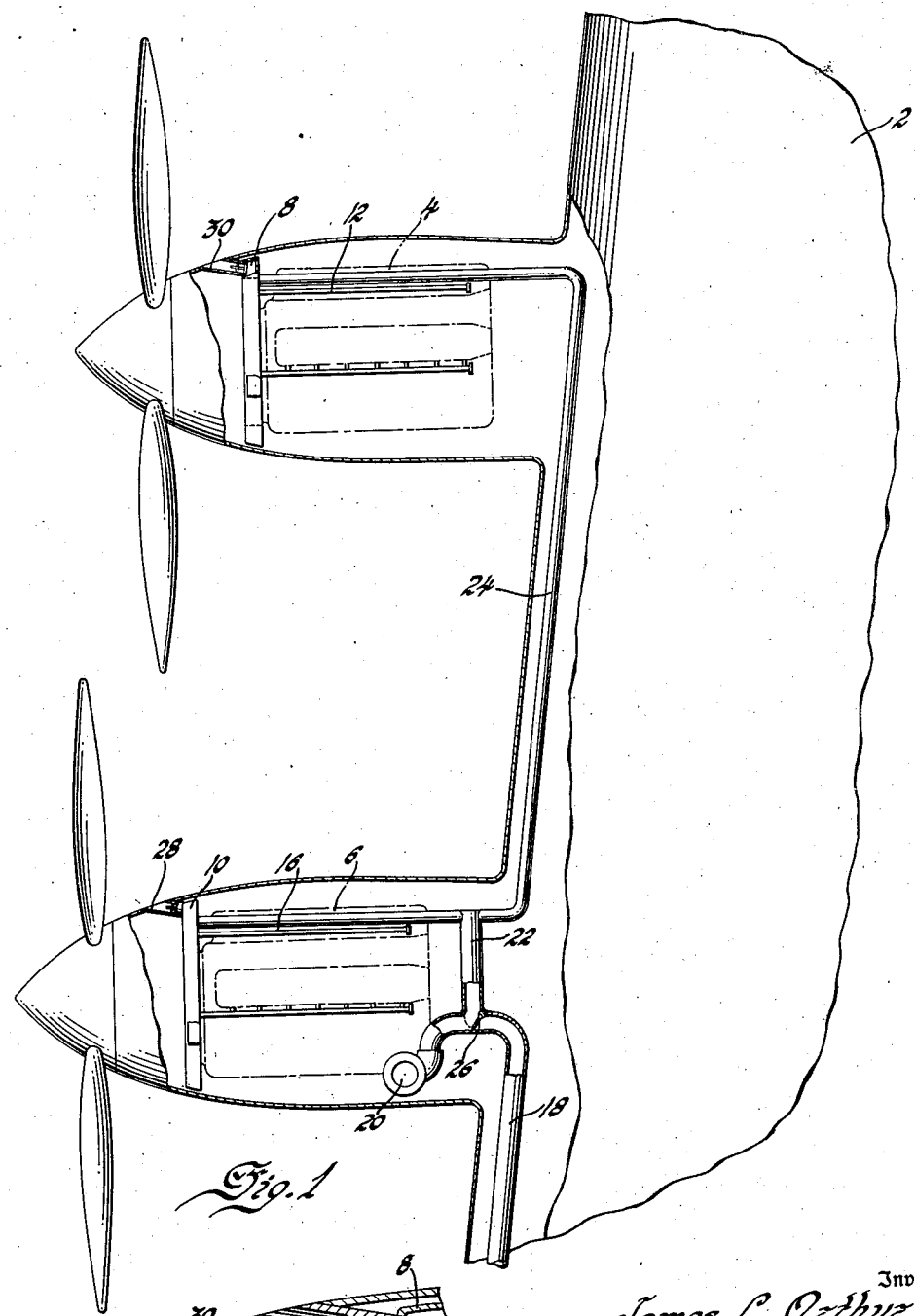
Figure 1 shows a top plan view of a portion of an aircraft wing, parts being broken away and shown in section, illustrating a supplemental cooling installation of our invention.
Figure 2 is an enlarged sectional view showing a control valve in the normal intake line.

Referring now more specifically to the drawing, in Figure 1 there is shown a portion of an aircraft wing 2 upon which are mounted two aircraft engines 4 and 6 shown in dotted outline which, for illustrative purposes only and in no sense as limiting our invention thereto, have been shown as the liquid cooled type. In the larger present-day ships, the same are designed to fly at high altitudes or in the stratosphere, and as such the cabins are provided with means to raise the pressure therein and to maintain a pressure substantially equal to atmospheric pressure at ground level at all times so that the passengers and crew may be comfortable and not suffer from lack of oxygen. These engines may also be provided with a circular hollow ring or annulus 8 and 10 into which air is introduced from scuppers during flight to cool auxiliary portions thereof such as the spark plugs and hottest portions of the exhaust manifold. This general type of auxiliary or supplemental cooling is the subject matter of a copending case in the name of Clyde R. Paton, Serial No. 497,423, filed August 5, 1943, entitled Cooling system, assigned to a common assignee.

Therefore, while flying, air is introduced into these annular rings 8 and 10 and conducted back over the engines through tubes such as 12 and 16 for supplementally cooling certain portions of the engines in which temperatures reach extremes. However, when the craft is on the ground and the engines are being tested or the same is merely idling at the airport, there is no need for cabin pressure and the pressure which can be generated by equipment for cabin pressure uses can be introduced into these annular rings 8 and 10 and provide sufficient pressure therein which is now not available from flight speed, to cool these same points such as spark plugs and exhaust manifolds of the engines. Cabin conduit 18 is therefore connected into this supercharged system and the supercharger per se 20 which normally introduces this pressure to the cabin may now, through conduits 22 and 24, provide pressure to rings 10 and 8, respectively. A hand operated valve 26 in line 18 is provided to switch the flow of air from the cabin to the conduit 22 for cooling the engines.

As before mentioned, during normal flight air is conducted into annular rings 8 and 10 through short ducts such as 28 and 30 from the exterior of the plane. Therefore, means must be provided to close such ducts during auxiliary ground cooling or the air pressure would leak out to atmosphere through these openings. A small T-valve such as 32 is therefore provided at the end of each of these conduits 28 and 30 capable of moving axially. Thus when the pressure entering through the conduits 28 and 30 is greater than the interior pressure, valve 32 will open and allow air to flow into the ring through the conduits, but if the pressure through lines 22 and 24 is greater when on ground then the valve will close and prevent any leakage of the air to atmosphere through these ducts.

It will therefore be obvious that by a simple supplemental conduit system the cabin supercharger may be used to provide auxiliary cooling means to the engines when on the ground.

We claim:

1. In aircraft propelled by engines, conductors for carrying coolant to desired points on the exterior surface of the engines to cool the same, means connecting the conductors with the outer surface of the aircraft whereby during flight air is forced in to provide the desired cooling, valve means at the juncture of the conductors and the connecting means to control flow therethrough and supplemental means for providing pressure within the conductors for providing coolant thereto during the time the craft is on the ground and operating the valve means to prevent leakage from the conductors.

2. In enclosed aircraft propelled by engines, conductors for carrying coolant to desired points on the exterior surface of the engines to cool the same, a plurality of means for introducing coolant means into the conductors and valve means actuated by pressure in the conductors to control which source shall supply the coolant.

3. In aircraft having a body enclosure and driving engines, means for carrying coolant to desired points on the engines to cool the same, means for providing pressure within the enclosure during flight to maintain substantially sea level atmospheric pressure and means connecting the pressure means with the cooling means so that when on the ground pressure may be supplied to cool the engines.

4. In aircraft having a body enclosure and driving engines, means for carrying coolant to desired points on the engines to cool the same, means for providing pressure within the enclosure during flight to maintain substantially sea level atmospheric pressure, conducting means interconnecting the coolant carrying means to the exterior of the body, further conducting means for connecting the pressure means to the coolant means and valve means for determining which source of coolant supply be utilized.

JAMES L. ARTHUR.
ROBERT M. WILLIAMS.